(12) United States Patent
Cho et al.

(10) Patent No.: US 6,979,038 B1
(45) Date of Patent: Dec. 27, 2005

(54) VIDEO MONITOR HINGE ASSEMBLY

(75) Inventors: Chang Min Cho, Gumi (KR); Suk Chae Son, Gumi (KR)

(73) Assignee: KTV USA, Inc., East Rutherford, NJ (US)

( * ) Notice: Subject to any disclaimer, the term of this patent is extended or adjusted under 35 U.S.C. 154(b) by 198 days.

(21) Appl. No.: 10/662,714

(22) Filed: Sep. 15, 2003

(51) Int. Cl.[7] .............................................. B60N 3/12
(52) U.S. Cl. ..................... 296/37.7; 312/248; 348/837; 248/918; 248/919; 248/921; 248/923
(58) Field of Search .............................. 296/37.7, 37.8; 312/7.2, 248; 348/837; 248/918, 919, 921, 248/923

(56) References Cited

U.S. PATENT DOCUMENTS

| | | | |
|---|---|---|---|
| 4,824,159 A * | 4/1989 | Fluharty et al. ........... | 296/37.7 |
| D319,435 S | 8/1991 | Brown | |
| 5,168,426 A | 12/1992 | Hoving et al. | |
| 5,209,448 A | 5/1993 | Hatanaka et al. | |
| 5,267,123 A | 11/1993 | Boothroyd et al. | |
| 5,345,362 A | 9/1994 | Winkler | |
| D358,583 S | 5/1995 | Winkler | |
| 5,847,685 A | 12/1998 | Otsuki | |
| 6,056,248 A | 5/2000 | Ma | |
| 6,081,420 A * | 6/2000 | Kim et al. ................... | 248/923 |
| 6,124,902 A * | 9/2000 | Rosen ......................... | 348/837 |
| 6,181,387 B1 * | 1/2001 | Rosen ......................... | 348/837 |
| 6,246,449 B1 * | 6/2001 | Rosen ......................... | 348/837 |
| 6,292,236 B1 | 9/2001 | Rosen | |
| 6,361,012 B1 * | 3/2002 | Chang ......................... | 296/37.8 |
| 6,364,390 B1 * | 4/2002 | Finneman .................. | 296/37.7 |
| 6,409,242 B1 * | 6/2002 | Chang ......................... | 296/37.7 |
| 6,412,848 B1 | 7/2002 | Ceccanese et al. | |
| 6,416,027 B1 * | 7/2002 | Hart ............................ | 296/37.7 |
| 6,464,195 B1 | 10/2002 | Hildebrandt | |
| 6,633,347 B2 * | 10/2003 | Kitazawa ..................... | 348/837 |
| 6,742,185 B1 * | 5/2004 | Andrews ..................... | 348/837 |
| 2001/0055196 A1 | 12/2001 | Anzai et al. | |
| 2002/0149708 A1 * | 10/2002 | Nagata et al. ............... | 348/837 |

* cited by examiner

*Primary Examiner*—Lori L. Coletta
(74) *Attorney, Agent, or Firm*—Seth Natter; Natter & Natter (57) ABSTRACT

A video monitor includes a display housing which is carried in a stowage recess of an overhead console. A broad rectangular leaf of a hinge assembly is pivotally mounted at one of its ends to the console and is pivotally mounted at its opposite end to a rear casing of the display housing at the approximate mid-height of the housing. The leaf is configured to lie within a recess formed in the rear casing of the display housing when the housing is stowed, overlying ventilation ports in the rear casing. To deploy the display housing in a viewing position, the leaf is rotated about a console pivot and the display housing is rotated relative to the leaf about a housing pivot.

17 Claims, 7 Drawing Sheets

VIDEO MONITOR HINGE ASSEMBLY

BACKGROUND OF THE INVENTION

1. Field of the Invention

This invention relates generally to display monitors and more particularly to a hinge assembly interconnecting a display housing and a console for articulated movement of the display housing from a stowed position to a viewing position.

2. Antecedents of the Invention

Overhead mounted display monitors, particularly in vehicular applications, generally comprised an LCD display housing pivotally joined to a ceiling mounted console. The display housing rotated from a stowed position, within a recess of the console, to a viewing position. A typical hinge assembly interconnecting a display housing and a console is illustrated in U.S. Pat. No. 6,412,848 and comprised a rigid extension projecting from a distal edge of the display housing, with the end of the extension being pivotally joined to the console. It should be appreciated that since the display housing pivoted about a single horizontal axis, limited viewing angles were available for vehicular passengers. This was particularly disadvantageous in view of the narrow off axis viewing range of typical LCD display panels.

A further problem encountered with respect to LCD display panels related to the LCD display panel driving circuitry contained in the display housing. The driving circuitry was generally positioned behind the LCD panel itself. Such circuitry generated heat which resulted in increased temperature levels within the enclosed area of the display housing. The increased temperature levels led to potential detrimental effects with respect to the circuit components and the performance of display. Vent openings were not generally provided in the display panels for aesthetic reasons. Further, vent openings in an exposed surface of a display housing constituted a source of attraction and potential danger to juvenile rear seat occupants who might be prone to poke objects into the openings.

SUMMARY OF THE INVENTION

A video monitor comprises a display housing and a console having a stowage recess for receiving the housing. A hinge assembly includes a broad rectangular hinge leaf pivotally mounted to the console along one of its ends and pivotally mounted at its opposite end to the display housing at the approximate center of the housing. The rear casing of the housing includes a recess which receives the hinge leaf when the panel is in its stowed position, such that the leaf is substantially flush with the surface of the rear casing. The recessed area of the rear casing includes ventilation ports which are covered by the leaf when the housing is stowed.

When the housing is moved to a viewing position, the leaf is rotated about a horizontal axis of a console pivot and also about a horizontal axis of a housing pivot to provide a variety of angular adjustments and also to vary the elevational and/or linear distance between a viewer and the display. A camming surface is provided in the console pivot for engagement by a spring follower to provide releasable leaf rotation stops at preferred leaf angles.

From the foregoing compendium, it will be appreciated that it is an aspect of the present invention to provide a video monitor hinge assembly of the general character described which is not subject to the disadvantages of the antecedents of the invention.

A feature of the present invention is to provide a video monitor hinge assembly of the general character described which provides optimum viewing angle adjustment.

A consideration of the present invention is to provide a video monitor hinge assembly of the general character described which facilitates the ventilation of a video display housing.

Another aspect of the present invention is to provide a video monitor hinge assembly of the general character described which facilitates easy deployment of a display housing.

Another feature of the present invention is to provide a video monitor hinge assembly of the general character described which is relatively low in cost.

A further consideration of the present invention is to provide a video monitor hinge assembly of the general character described which is capable of both varying a viewing angle and the height of a video display panel relative to a viewer.

To provide a video monitor hinge assembly of the general character described which functions as a cover for ventilation openings when a display housing is in a stowed position is yet a further aspect of the present invention.

A further feature of the present invention is to provide a video monitor hinge assembly of the general character described which is equally well suited for use in conjunction with both horizontal, i.e. ceiling and vertical, i.e. wall or seat back applications.

To provide a video monitor hinge assembly of the general character described which is well suited for economical mass production fabrication is a still further consideration of the present invention.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

DESCRIPTION OF THE PREFERRED EMBODIMENT

Referring now in detail to the drawings, wherein like numerals denote like components throughout, the reference numeral 10 denotes generally a video monitor comprising a display housing 12 and a console 14. Pursuant to the invention, a video monitor hinge assembly 16, constructed in accordance with and embodying the invention, interconnects the display housing 12 with the console 14. The hinge assembly 16 is employed to guide the movement of the display housing 12 relative to the console 14 from a display housing stowage position, seated within an open stowage cavity 18 of the console (as illustrated in FIG. 2), to a viewing position depicted in FIG. 1 and FIG. 3, wherein the display panel 20 is at an appropriate viewing angle and distance relative to a viewer.

The video monitor 10 may include controls and accessories, such as, an infrared remote control sensor 22, manual power and other function sensors including input source selection, volume channel selection, menu, etc. 24, auxiliary interior vehicle lights 26, input/output jacks 28 and a latch control 30, for releasing the display housing 12 from the stowage cavity 18, all of which do not form part of the present invention.

Pursuant to the invention, the hinge assembly 16 includes a substantially rectangular broad hinge leaf 32 having a hollow interior and formed of an outer panel 34 and an inner panel 36. The width and length of the hinge leaf 32 is configured to be received within a generally rectangular shaped recess 38 formed in a rear casing 40 of the display housing 12. The recess 38 extends from an edge 35 of the display housing 12 toward the opposite edge and terminates at a closed end wall 46 positioned at the approximate mid-height of the display housing 12. There are strategically positioned through the rear casing 40 at the recess 38, a plurality of ventilation ports 42 for dissipation of heat generated by the display panel 20 and its driving circuitry. It should be noted that an end 44 of the hinge leaf 32 is pivotally mounted in the rear casing 40 adjacent the proximal end 46 of the recess 38.

Figure 8:
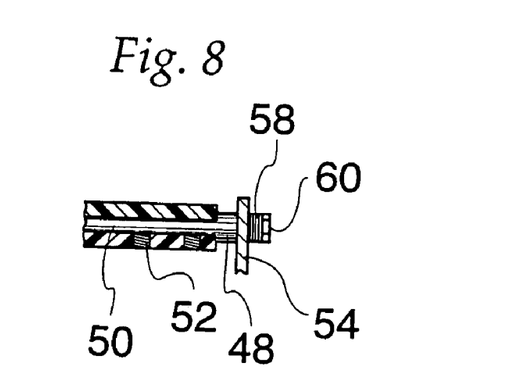
FIG. 8 is an enlarged scale fragmentary sectional view through the display end of the hinge leaf, with portions deleted for clarity, the same being taken substantially along the plane 8—8 of FIG. 5 and illustrating a journal pin fixed in the display end of the hinge leaf.

Referring to FIG. 8, the end 44 of the hinge leaf 0.32 carries a pair of coaxial metal journal pins 48 having a noncircular portion 50 secured between the inner and outer panels 34, 36 of the hinge leaf and held fast by one or more set screws 52. Extending from the noncircular portion 50 of each journal pin 48 is a coaxial cylindrical axle, which is received in a bearing surface of a leg 54 of a metal bearing plate 56. A plurality of spring washers 58 are positioned between the leg 54 and a securing nut or screw 60 at the end of the axle to provide a frictional restraint, maintaining the display housing 14 at a selected angle relative to the hinge leaf 32. A plurality of integral mounting posts 62 extend from the inner face of the rear casing 40 for supporting the bearing plate 56 which is fixed in position by screws.

Figure 1:
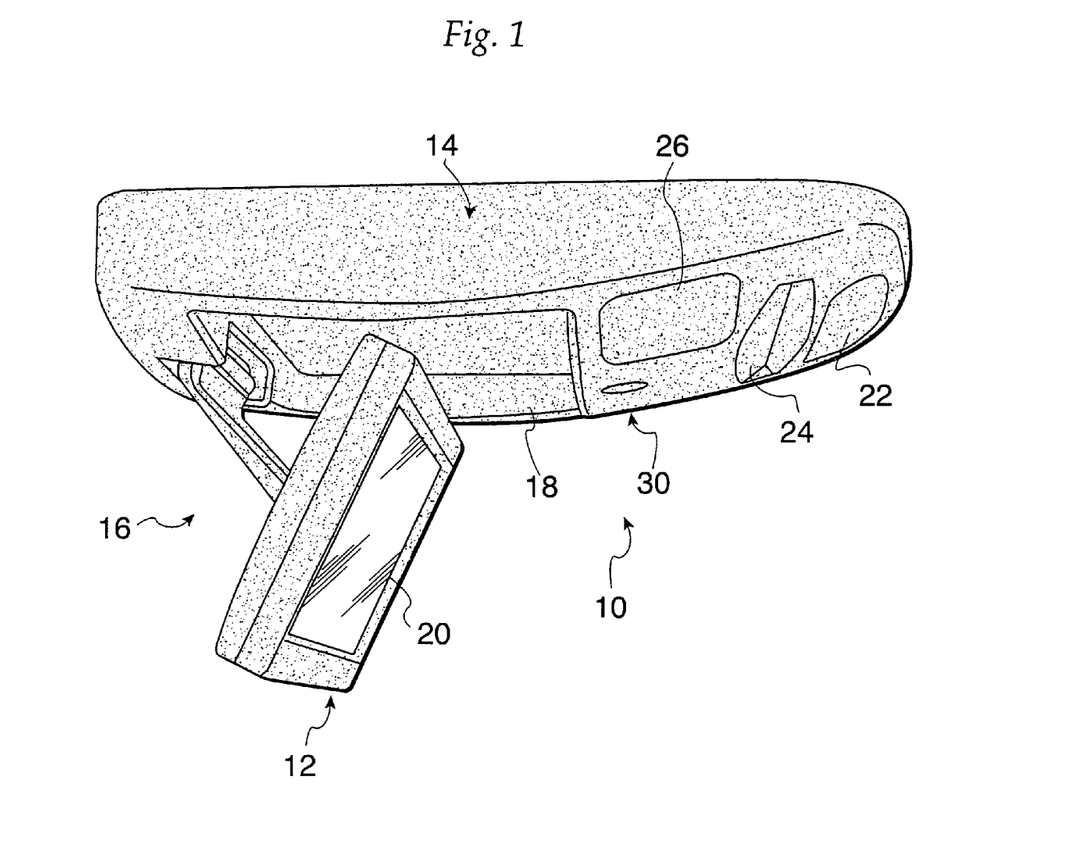
FIG. 1 is a perspective illustration of a video monitor having a hinge assembly constructed in accordance with and embodying the invention interconnecting a display housing and an overhead console with the display housing being deployed in a viewing position.
Figure 2:
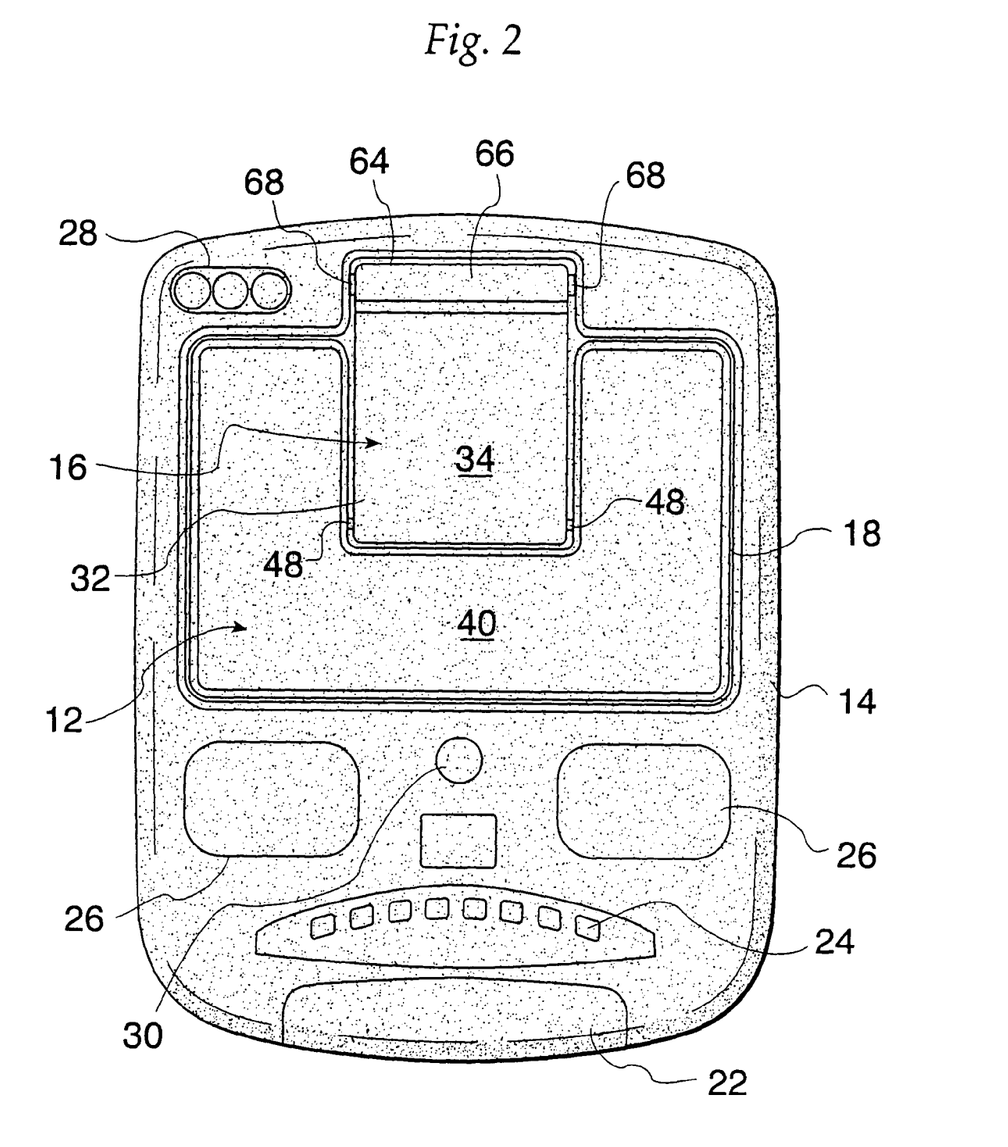
FIG. 2 is a bottom plan view of the video monitor with the display housing being in a stowed position, received within a cavity of the console and showing a rear casing of the display housing and a leaf of the hinge assembly seated in a recess of the rear casing.

As will be noted from an examination of FIG. 1 and FIG. 2, the stowage cavity 18 includes a distal extension 64 which receives a casing end 66 of the hinge leaf 32. A pair of substantially coaxial cylindrical journal pins 68 are received within opposite ends of a cylindrical bore 70 formed by mating inner surfaces of the outer panel 34 and inner panel 36 of the hinge leaf 32. The journal pin 68 includes an axial channel 72 having a substantially flat base, while cylindrical surfaces of the journal pin 68 are rotatably received in a mating bearing surface of a leg 74 of a bearing plate 76. A portion of each journal pin 68 received within the bore 70 of the hinge leaf 32 is held fast and secured by a set screw 78 which is accessible through an assembly slot 80 formed in the distal extension 64. The set screw 78 bears against the base of the channel 72 to lock the journal pin in position.

Figure 9:
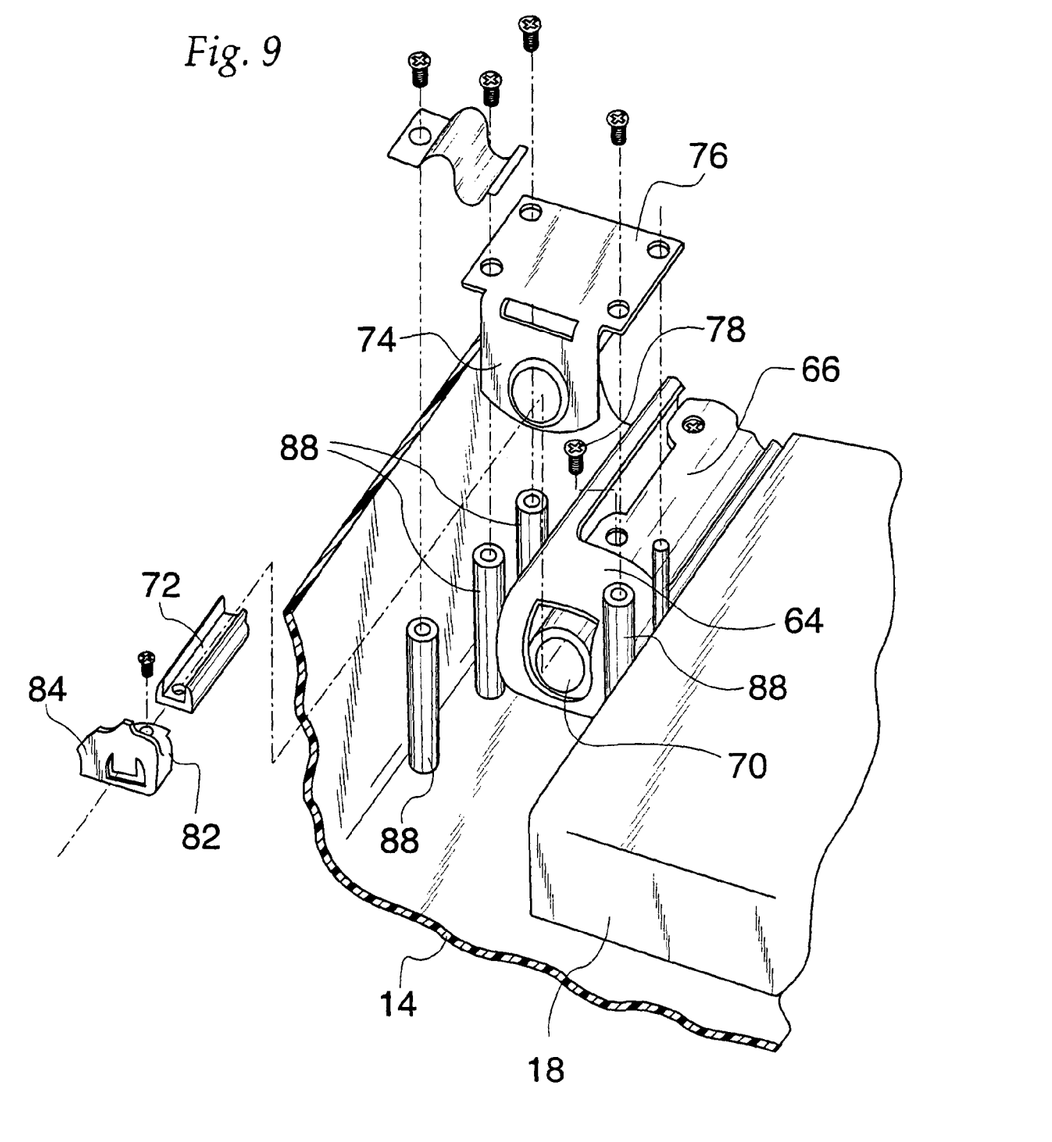
FIG. 9 is an enlarged scale fragmentary exploded perspective view of the console and illustrating a bearing bracket which receives a journal pin projecting from the console end of the hinge leaf and a cam hub having a cam surface secured to the journal pin with the cam surface engaged by a spring follower to provide hinge leaf rotation stops at preferred hinge leaf angles.

A portion of the journal pin 68 extends axially beyond the bearing surface of the leg 74 and is received within a matingly configured aperture of a cam hub 82 to be fixed by a set screw. The cam hub 82 includes a cam surface 84 which is engaged by a spring follower 86 to provide releasable hinge leaf rotation stops at preferred hinge leaf angles relative to the console.

A plurality of mounting posts 88 project from the inner surface of the console 14 for the purpose of mounting the bearing plate 76 through the use of suitable screws and also for mounting the follower 86.

Figure 3:
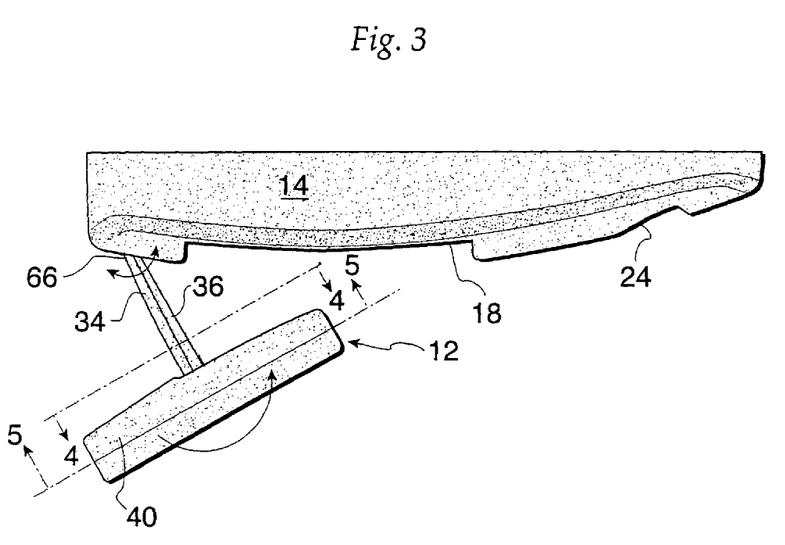
FIG. 3 is a side elevational view of the video monitor illustrating the display housing in a deployed position.
Figure 4:
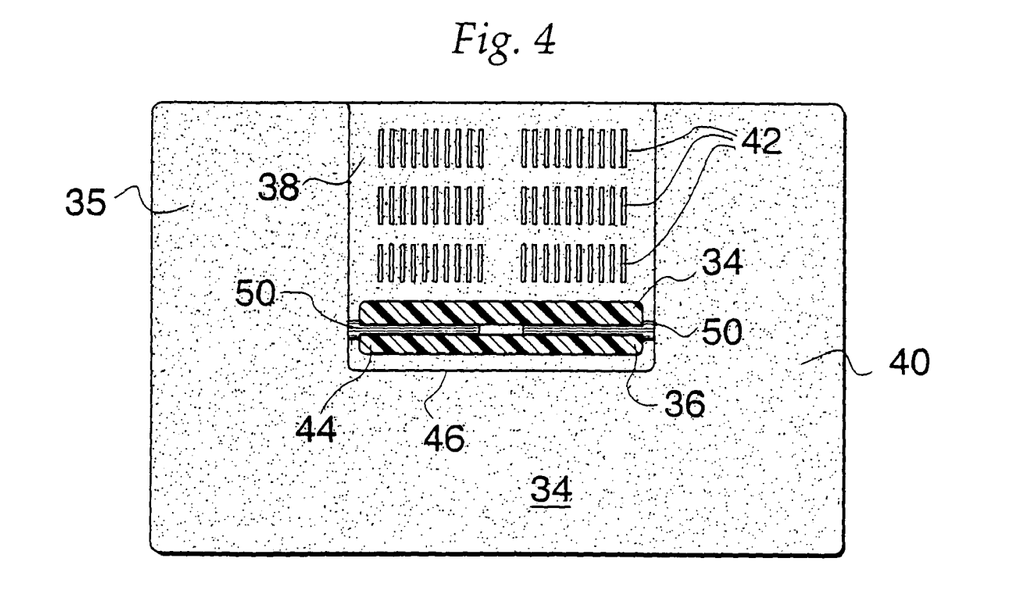
FIG. 4 is a sectional view through the hinge leaf, the same being taken substantially along the plane 4—4 of FIG. 3 and illustrating the rear casing of the display housing with ventilation ports extending through the recess.
Figure 5:
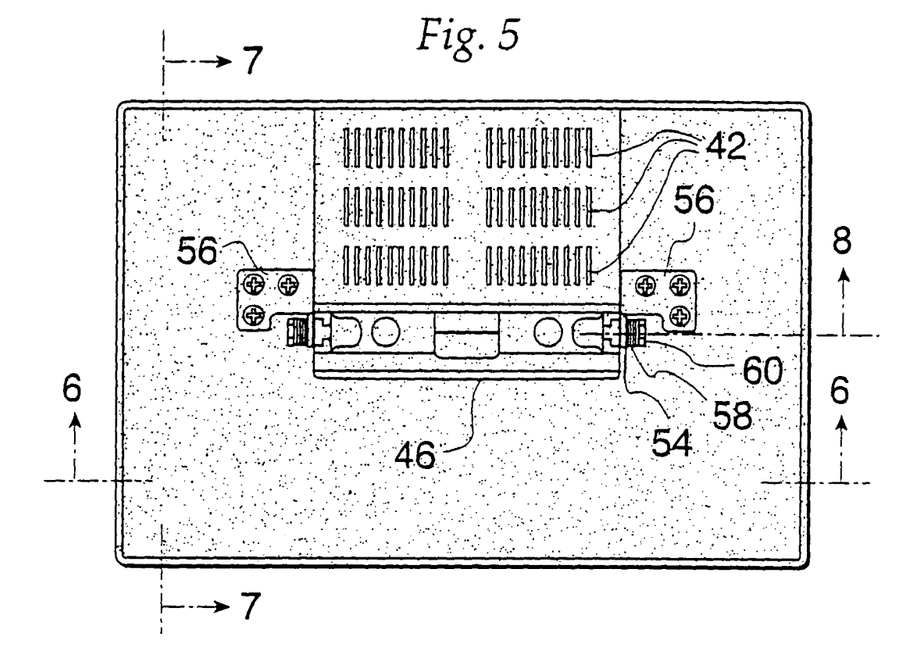
FIG. 5 is a sectional view through the display housing, the same being taken substantially along the plane 5—5 of FIG. 3, with portions deleted for clarity and illustrating portions of a housing pivot which interconnects the hinge leaf and the housing.
Figure 6:
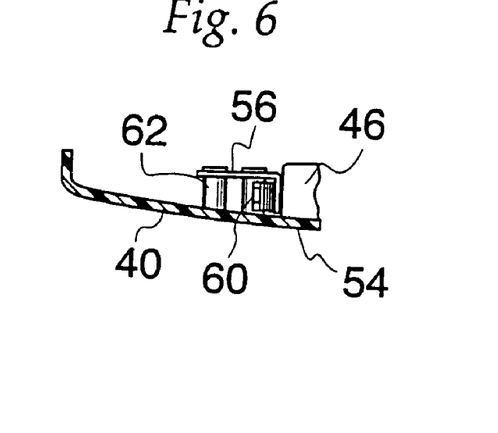
FIG. 6 is an enlarged scale fragmentary sectional view through the housing, the same being taken substantially along the plane 6—6 of FIG. 5 and illustrating a bearing bracket secured in the housing.
Figure 7:
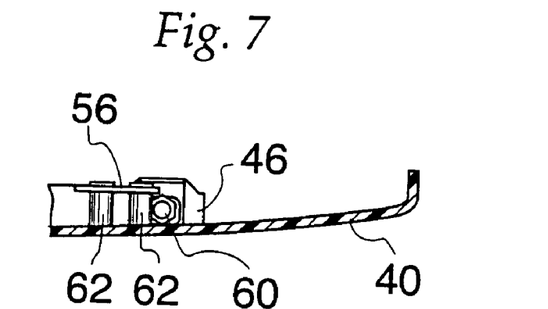
FIG. 7 is a further fragmentary sectional view through the display housing, the same being taken substantially along the plane 7—7 of FIG. 5 also illustrating the bearing bracket.

With reference now to FIG. 3, it will be noted that pursuant to the invention, the hinge leaf 32 may be rotated about the journal pins 68 from a stowage position, wherein the outer panel 34 is substantially flush with the contour of the console 14, to a maximum deployment position of approximately 90° relative to the plane of the console. It should be additionally noted that the display may rotate relative to the hinge leaf 32 about the journal pins 48 a total of approximately 90° to provide an appropriate viewing angle for the display panel 20.

Further, by varying the angle of the hinge leaf 32 relative to the console 14, the elevation or height of the display panel 20 may be varied as well as the linear distance between the display panel and the viewer and the viewing angle may be simultaneously adjusted through rotation of the display housing relative to the hinge leaf. Throughout the range of motion of the display housing, the axis of the journal pins 48 is maintained parallel to the axis of the journal pins 68.

Figure 10:
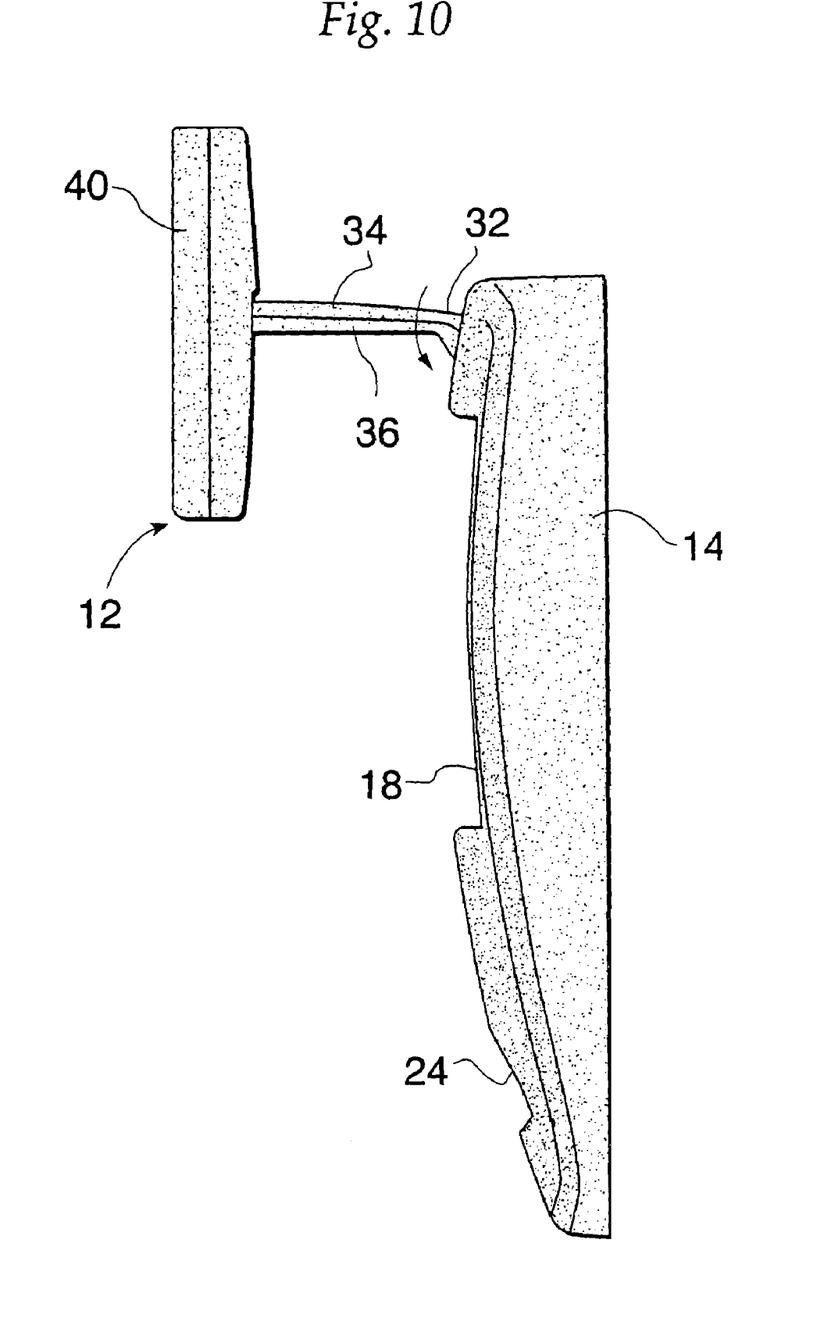
FIG. 10 is a side elevational view of the video monitor deployed in a vertical position.

It should be additionally noted that the hinge assembly 16 of the present invention may be readily utilized for deployment of the video monitor in a vertical, e.g. wall or seat back mount configuration, without structural or other modification as illustrated in FIG. 10. In such instance, an appropriate driver circuit input pin is selected such that the display panel 20 reverses image orientation 180°. Such reversal may be accommodated utilizing existing display panel driving circuitry and either a remote control selection or a manual switch selection of the appropriate driver circuit pin.

Thus it will be seen that there is provided a video monitor hinge assembly which achieves the various aspects, features and considerations of the present invention and which is well adapted to meet the conditions of practical usage.

As various changes might be made in the vehicle monitor hinge assembly above set forth without departing from the spirit of the invention, it is to be understood that all matter herein described or shown in the accompanying drawings is to be interpreted as illustrative and not in a limiting sense.

What is claimed as new and desired by Letters Patent of the United States:

1. In a video monitor having a console and a display housing, the display housing carrying a video display panel, the console including a stowage cavity dimensioned to receive the display housing, the improvement comprising a hinge assembly coupling the console and the display housing, the hinge assembly including a leaf, one end of the leaf being pivotally mounted to the console and the other end of the leaf being pivotally mounted to the display housing, the display housing including a rear casing having a recess, the recess being dimensioned to receive the leaf when the display housing is stowed in the stowage cavity, whereby both viewing angle and linear distance or elevation between a viewer and the display panel may be adjusted by rotating the leaf relative to the casing and the display housing relative to the leaf.

2. In a video monitor having a console and a display housing as constructed in accordance with claim 1, the improvement further comprising at least one ventilation port extending through the rear casing, the ventilation port being positioned at the recess, whereby the ventilation port is inaccessible when the display housing is stowed in the stowage cavity.

3. In a video monitor having a console and a display housing as constructed in accordance with claim 1, the improvement further comprising the leaf being substantially rectangular and the recess being substantially rectangular.

4. In a video monitor having a console and a display housing as constructed in accordance with claim 1, the improvement further comprising the one end of the leaf being pivotally mounted to the display housing about one axis and the other end of the leaf pivotally mounted to the console about another axis, the axes being parallel.

5. In a video monitor having a console and a display housing as constructed in accordance with claim 1, the improvement further comprising the recess extending from an edge of the display housing toward an opposite edge, the recess terminating at a closed end substantially at the mid-height of the display housing, the other end of the leaf being positioned at the closed end of the recess.

6. In a video monitor having a console and a display housing as constructed in accordance with claim 5, the improvement further comprising a journal projecting from opposite sides of the leaf adjacent the other end of the leaf, the journal being received within bearing surfaces of the display housing.

7. In a video monitor having a console and a display housing as constructed in accordance with claim 1, the improvement further comprising a distal extension of the stowage cavity, the one end of the leaf being positioned within the distal extension.

8. In a video monitor having a console and a display housing as constructed in accordance with claim 7, the improvement further comprising a journal projecting from opposite sides of the leaf adjacent the one end of the leaf, the journal being received within bearing surfaces of the console.

9. In a video monitor having a console and a display housing as constructed in accordance with claim 8, the improvement further comprising a cam positioned within the console, the cam being non-rotatably coupled to the journal, the console further including a spring follower, the spring follower being in engagement with the cam, whereby releasable leaf pivot stops are provided.

10. In a video monitor having a console and a display housing as constructed in accordance with claim 8, the improvement further comprising a plurality of bearing plates fixed in the console, the bearing surfaces being formed in the bearing plates.

11. A method of safely ventilating a display housing of a vehicle mounted video monitor, the monitor including the display housing and a console, the method comprising the steps of:

a) providing a plurality of ventilation ports through a rear casing of the display housing, b) providing a hinge leaf dimensioned to overlie the ventilation ports, c) pivotally interconnecting one end of the hinge leaf to the rear casing and pivotally interconnecting the other end of the hinge leaf to the console, d) overlying the ventilation ports with the hinge leaf when the display housing is stowed in the console, e) pivoting the display monitor relative to the hinge leaf to a viewing position, wherein the hinge leaf is not overlying the ventilation ports, and f) stowing the display housing in the console with the hinge leaf overlying the ventilation ports when viewing has been concluded.

12. A method of safely ventilating a display housing of a vehicle mounted video monitor in accordance with claim 11, the method further including the step of forming a recess in the rear casing dimensioned to receive the hinge leaf and positioning the ventilation ports in the recess.

13. A method of safely ventilating a display housing of a vehicle mounted video monitor in accordance with claim 11, the method including the further step of mounting the console to the ceiling of the vehicle for overhead video display.

14. A method of safely ventilating a display housing of a vehicle mounted video monitor in accordance with claim 11, the method including the further step of mounting the console to a substantially vertical surface of the vehicle.

15. In a video monitor having a console and a display housing, the display housing carrying a video display panel, the console including a stowage cavity dimensioned to receive the display housing, the improvement comprising a hinge assembly coupling the console and the display housing, the hinge assembly including a leaf, one end of the leaf being pivotally mounted to the console and the other end of the leaf being pivotally mounted to the display housing, the display housing including a rear casing having a plurality of ventilation ports extending therethrough, the leaf overlying the ventilation ports when the display panel is stowed in the stowage cavity, the ventilation ports being open for air flow therethrough when the display panel is rotated relative to the leaf to an orientation other than that when the display panel is stowed in the stowage cavity.

16. In a video monitor having a console and a display housing as constructed in accordance with claim 15, the improvement further comprising one end of the leaf being pivotally mounted to the display housing about one axis and another end of the leaf being pivotally mounted to the console about another axis, the axes being parallel.

17. In a video monitor having a console and a display housing as constructed in accordance with claim 15, the improvement further comprising a recess in the rear casing, the recess extending from one edge of the rear casing toward an opposite edge, the recess being dimensioned to receive the leaf when the display housing is in the stowed position, the ventilation ports being positioned in the recess.

* * * * *